(12) United States Patent
Yang (10) Patent No.: US 9,146,645 B2
(45) Date of Patent: Sep. 29, 2015

(54) TOUCH PANEL INCLUDING TOUCH SENSOR ARRAY

(71) Applicants: AU Optronics (Suzhou) Corp., Ltd., Suzhou (CN); AU Optronics Corporation, Hsin-chu (TW)

(72) Inventor: Xue-Feng Yang, Suzhou (CN)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 39 days.

(21) Appl. No.: 14/069,486

(22) Filed: Nov. 1, 2013

(65) Prior Publication Data

US 2014/0300833 A1    Oct. 9, 2014

(30) Foreign Application Priority Data

Apr. 3, 2013    (CN) .......................... 2013 1 0114013

(51) Int. Cl.
  *G06F 3/044*    (2006.01)

(52) U.S. Cl.
  CPC ...... *G06F 3/044* (2013.01); *G06F 2203/04111* (2013.01)

(58) Field of Classification Search
  None
  See application file for complete search history.

(56) References Cited

U.S. PATENT DOCUMENTS

| 8,711,105 B2 * | 4/2014 | Gray et al. ............... 345/173 |
| 2010/0045614 A1 | 2/2010 | Gray et al. |
| 2014/0055689 A1 * | 2/2014 | Lu et al. .................. 349/12 |
| 2014/0078068 A1 * | 3/2014 | Jones et al. ............. 345/173 |

FOREIGN PATENT DOCUMENTS

| CN | 101581843 | 11/2009 |
| CN | 101655754 | 2/2010 |
| TW | 360774 B1 * | 3/2012 |
| TW | I360774 | 3/2012 |
| TW | M434257 | 7/2012 |

* cited by examiner

*Primary Examiner* — Kent Chang
*Assistant Examiner* — Nathan Brittingham
(74) *Attorney, Agent, or Firm* — WPAT, PC; Justin King (57) ABSTRACT

A touch sensor array includes a plurality of straight sensing series and a plurality of ladder-like sensing series. The straight sensing series are separated to each other. Each of the straight sensing series includes first sensing pads and first bridge lines, and each of the first bridge lines is connected to two adjacent first sensing pads. The ladder-like sensing series are separated to each other. Each of the ladder-like sensing series includes second sensing pads, second bridge lines and third bridge lines. The second bridge lines and the third bridge lines are alternatively disposed, and any two adjacent second sensing pads are connected through one of the second bridge lines or one of the third bridge lines. Each of the ladder-like sensing series crosses one of the first bridge lines.

13 Claims, 6 Drawing Sheets

TOUCH PANEL INCLUDING TOUCH SENSOR ARRAY

RELATED APPLICATIONS

This application claims priority to China Application Serial Number 201310114013.7, filed Apr. 3, 2013, which is herein incorporated by reference.

BACKGROUND

1. Technical Field

The present disclosure relates to a touch panel including a touch sensor array.

2. Description of Related Art

The touch interface facilitates users to input information and make options, such that touch display panels with the touch interface have been seen in more and more diverse applications. The touch display panel can be classified as an out-cell touch display panel and an embedded touch display panel depending on the position of the touch panel disposed in the touch display panel. The out-cell touch display panel refers to a display panel with the touch panel external disposed thereto. The embedded touch display panel, concerning the use in a liquid crystal display panel, can further be classified into a type that touch sensors disposed on a driving substrate and another type that touch sensors disposed on a color filter substrate depending on the position of the touch sensor array. Besides, the embedded touch display panel can be classified as a resistive, a capacitive and an optical touch display panels based on the induction principles of electricity. Recently, multi-touch capacitive touch panels attract much attention.

A traditional capacitive touch panel includes a touch sensor array including a plurality of X direction sensing series and a plurality of Y direction sensing series. Each of the X direction sensing series and the Y direction sensing series includes a plurality of sensing pads so as to accurately sense touch positions of users.

A metal jumper line is used to connect to two adjacent sensing pads and disposed at a junction between the X direction sensing series and the Y direction sensing series so as to avoid short-circuit. However, the metal jumper line may be broken when electrostatic discharge occurs, such that one of the sensing series may not be operated. Since the metal jumper line must be set at each junction, the amount of metal jumper lines is significant. Therefore, many metal jumper lines may be broken when electrostatic discharge occurs, and thus many sensing series may not be operated.

In view of this, how to improve abnormal probability in operation of sensing series from the electrostatic discharge is an important issue to be addressed.

SUMMARY

An aspect of the present disclosure provides a touch panel including a substrate and a touch sensor array. The touch sensor array includes a plurality of straight sensing series and a plurality of ladder-like sensing series. The straight sensing series are separated to each other. Each of the straight sensing series includes first sensing pads and first bridge lines, and each of the first bridge lines is connected to two adjacent first sensing pads. The ladder-like sensing series are separated to each other. Each of the ladder-like sensing series includes second sensing pads, second bridge lines and third bridge lines. The second bridge lines and the third bridge lines are alternatively disposed, and any two adjacent second sensing pads are connected through one of the second bridge lines or one of the third bridge lines. Each of the ladder-like sensing series crosses one of the first bridge lines.

According to one embodiment of the present disclosure, the straight sensing series are substantially extending along a first direction, and the ladder-like sensing series are substantially extending along a second direction different from the first direction, and an included angle between the first direction and the second direction is about 45°, and the second bridge lines are substantially parallel to the first direction, and the third bridge lines are substantially parallel to a third direction different from the first direction and the second direction.

According to one embodiment of the present disclosure, an included angle between the first direction and the third direction is about 90°.

According to one embodiment of the present disclosure, each of the third bridge lines and each of the first bridge lines are disposed at various layers, and each of the third bridge lines crosses one of the first bridge lines, and each of the third bridge lines and each of the first bridge lines are made of different materials, and each of the third bridge lines or each of the first bridge lines is made of metal.

According to one embodiment of the present disclosure, the first bridge lines without crossing the third bridge lines and the second bridge lines are disposed at a same layer.

According to one embodiment of the present disclosure, the substrate includes a color filter substrate or a thin film transistor array substrate.

According to one embodiment of the present disclosure, each of the second sensing pads has a width greater than a width of each of the second bridge lines and a width of each of the third bridge lines, and the first sensing pads and the second sensing pads are disposed at a same layer.

According to one embodiment of the present disclosure, the touch sensor array further includes: a plurality of first sensing signal transmission lines and a plurality of second sensing signal transmission lines, each of the first sensing signal transmission lines connected to one of the straight sensing series, each of the second sensing signal transmission lines connected to one of the ladder-like sensing series; and a drive circuit disposed on a side region of the substrate, wherein the first sensing signal transmission lines and the second first sensing signal transmission lines are connected to the drive circuit.

According to one embodiment of the present disclosure, one of the second sensing signal transmission lines is disposed between two adjacent first sensing signal transmission lines, and ends of the first sensing signal transmission lines and ends of the second sensing signal transmission lines are disposed on the same side region of the substrate.

According to one embodiment of the present disclosure, each of the first sensing pads or each of the second sensing pads has a shape of rhombus, trapezoid, hexagonal, cross shape, triangular, pentagon or star.

BRIEF DESCRIPTION OF THE DRAWINGS

The disclosure may be more fully understood by reading the following detailed description of the embodiment, with reference made to the accompanying drawings as follows.

DETAILED DESCRIPTION

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a capacitor includes aspects having two or more such capacitors, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

Figure 1:
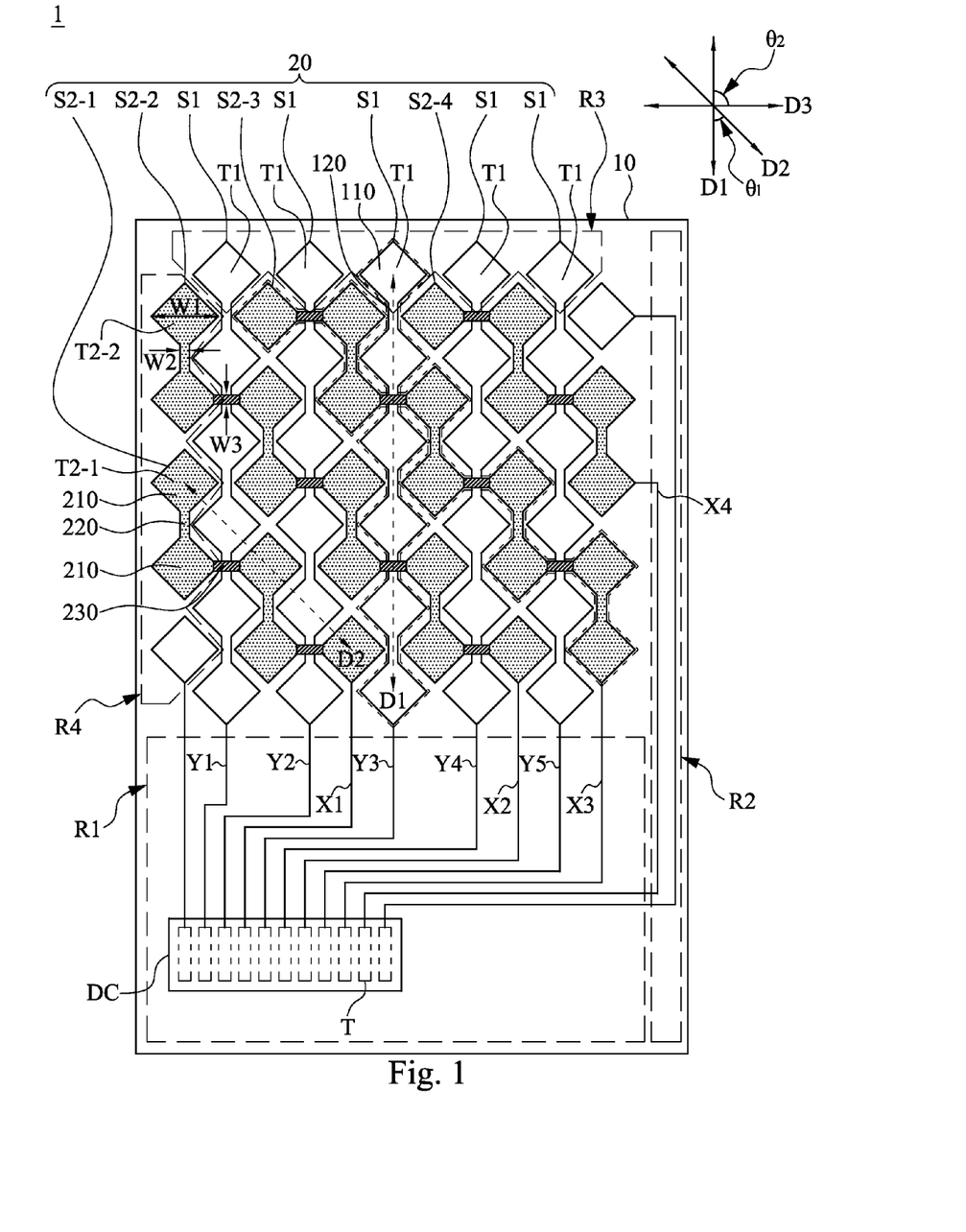
FIG. 1 is a top view of a touch panel according to a first embodiment of the present disclosure.

FIG. 1 is a top view of a touch panel 1 according to a first embodiment of the present disclosure. The touch panel 1 includes a substrate 10 and a touch sensor array 20 disposed thereon. The touch sensor array 20 includes a plurality of straight sensing series S1 and a plurality of ladder-like sensing series S2-1, S2-2, S2-3, S2-4. As shown in FIG. 1, the ladder-like sensing series S2-1, S2-2, S2-3, S2-4 are marked with dots.

The straight sensing series S1 are substantially extending along a first direction D1. The straight sensing series S1 are separated to each other; that is, two adjacent straight sensing series S1 are not contacted with each other. Each of the straight sensing series S1 includes first sensing pads 110 and first bridge lines 120, and each of the first bridge lines 120 is connected to two adjacent first sensing pads 110.

The ladder-like sensing series S2-1, S2-2, S2-3, S2-4 are separated to each other; that is, two adjacent ladder-like sensing series are not contacted with each other. In the current embodiment, four ladder-like sensing series are given as an example but not limited thereto. The amount of the ladder-like sensing series may be greater than four. Each of the ladder-like sensing series S2-1, S2-2, S2-3, S2-4 includes second sensing pads 210, second bridge lines 220 and third bridge lines 230. In each of the ladder-like sensing series S2-1, S2-2, S2-3, S2-4, two adjacent second sensing pads 210 are connected through one of the second bridge lines 220 or one of the third bridge lines 230. In the embodiment of FIG. 1, the second bridge line 220 is connected to two vertical adjacent second sensing pads 210, and the third bridge line 230 is connected to two horizontal adjacent second sensing pads 210. Specifically, for the single ladder-like sensing series, the second sensing pad 210, the second bridge line 220, another second sensing pad 210 adjacent to the second sensing pad 210, and the third bridge line 230 are sequentially arranged and electrically connected. That is, the second bridge lines 220 and the third bridge lines 230 are alternatively disposed.

Each of the ladder-like sensing series S2-1, S2-2, S2-3, S2-4 extends along a second direction D2 different from the first direction D1. In the single ladder-like sensing series, a connection between centers of two sensing pads 210 at relatively two opposite ends can be regarded as an extending direction of the ladder-like sensing series. In the depicted embodiment, an included angle $\theta_1$ between the first direction D1 and the second direction D2 is about 45°. However, the skilled in the art should understand that the extending direction of the straight sensing series S1 and that of the ladder-like sensing series S2-1, S2-2, S2-3, S2-4 may be changed, and the included angle $\theta_1$ may also be appropriately adjusted and thus not limited thereto.

In the current embodiment, the second bridge lines 220 are substantially parallel to the first direction D1, and the third bridge lines 230 are substantially parallel to a third direction D3 different from the first direction D1 and the second direction D2. As shown in FIG. 1, an included angle $\theta_2$ between the first direction D1 and the third direction D3 is about 90°. However, the skilled in the art should understand that the extending direction of the second bridge lines 220 and that of the third bridge lines 230 of the ladder-like sensing series and the included angle $\theta_2$ may be appropriately adjusted, and thus not limited thereto.

The second bridge lines 220 are substantially parallel to the first bridge lines 120, and the third bridge lines 230 extend along the third direction D3. Thus, each of the second bridge lines 220 does not cross any of the first bridge lines 120. In the embodiment of FIG. 1, each of the third bridge lines 230 crosses one of the first bridge lines 120.

Accordingly, the third bridge lines 230 and the first bridge lines 120 should be disposed at various layers of the touch sensor array 20. As shown in FIG. 1, each of the third bridge lines 230 crosses one of the first bridge lines 120 and is disposed on the corresponding first bridge line 120. In embodiments, the third bridge lines 230 may be disposed beneath the first bridge lines 120. An insulating layer (not shown) may be interposed between the third bridge lines 230 and the first bridge lines 120 to separate from each other.

One terminal of each of the straight sensing series S1 may be connected with a driving circuit (not shown), while another terminal (not marked) thereof is connected with one of the ends T. One terminal of each of the ladder-like sensing series S2-1, S2-2, S2-3, S2-4 may be connected with a driving circuit (not shown), while another terminal (not marked) thereof is connected with one of the ends T. For example, terminal T1 of the straight sensing series S1 is located in side region R3 of the substrate 10, and another terminal thereof is connected with one of the ends T. Terminals T2-2, T2-1 of the ladder-like sensing series S2-2, S2-1 are located in side region R4 of the substrate 10, and another terminals thereof are connected with one of the ends T. Side region R1 is opposite to side region R3, and side region R2 is opposite to side region R4. Side regions R2, R4 are substantially located between the side regions R1, R3. In other words, each of the side regions R1, R3 extends along the third direction D3. Each of the side regions R2, R4 extends along the first direction D1. Sensing pads 110, 210 are surrounded by the side regions R1, R2, R3 and R4.

In one embodiment, the third bridge lines 230 and the first bridge lines 120 may be made of different materials. For an example, the third bridge lines 230 are made of metal, and the first bridge lines 120 are made of a transparent conductive material.

Since the second bridge lines 220 are substantially parallel to the first bridge lines 120, the second bridge lines 220 and the first bridge lines 120 may be made by same layer and patterned simultaneously. For example, the first bridge lines 120 and the second bridge lines 220 may be disposed on the substrate 10 and contacts an upper surface thereof.

The first sensing pads 110 and the second sensing pads 210 are misplaced and not overlapped or in contact with each other, and thus those pads can be formed by a same layer. In one specific embodiment, the first sensing pads 110, the first bridge lines 120, the second sensing pads 210 and the second bridge lines 220 may be formed by a same layer, and the third bridge lines 230 may be formed by another layer. That is, the first sensing pads 110, the first bridge lines 120, the second sensing pads 210 and the second bridge lines 220 may be formed by patterning a conductive layer, and the third bridge lines 230 may be formed by patterning another conductive layer. In other words, the first sensing pads 110, the first bridge lines 120, the second sensing pads 210 and the second bridge lines 220 may be constituted by a single patterned conductive layer.

Figure 2:
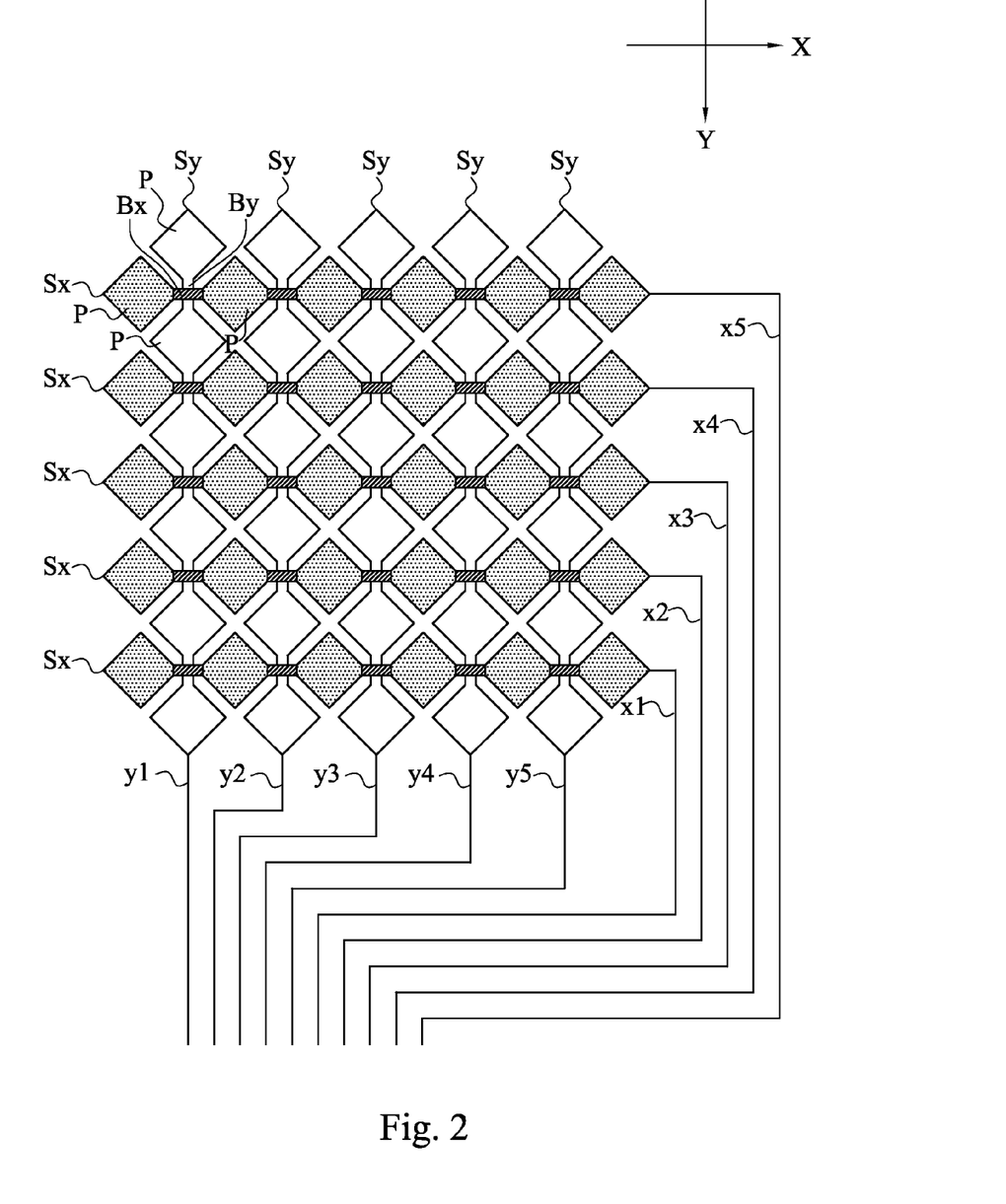
FIG. 2 is a top view of a touch sensor array according to a comparative example of the present disclosure.

FIG. 2 is a top view of a touch sensor array according to a comparative example of the present disclosure. The touch sensor array of FIG. 2 includes a plurality of X direction sensing series Sx and a plurality of Y direction sensing series Sy. Each of the X direction sensing series Sx includes sensing pads P and X direction bridge lines Bx. Each of the Y direction sensing series Sy includes sensing pads P and Y direction bridge lines By. The X direction bridge line Bx crosses the Y direction bridge line By and is disposed thereon. In other words, the X direction bridge line Bx is needed at each junction to electrically connect to two adjacent sensing pads P of the X direction sensing series Sx.

In the comparative example of FIG. 2, the touch sensor array includes five X direction sensing series Sx and five Y direction sensing series Sy, and thus twenty-five jumper lines (i.e., twenty-five X direction bridge lines Bx) are needed. In contrast, in the embodiment of FIG. 1, the touch sensor array 20 only needs twelve jumper lines (i.e., the third bridge lines 230). As mentioned above, the touch sensor array 20 of the embodiment of the present disclosure needs less jumper lines. In another aspect, in the comparative example of FIG. 2, each of the X direction sensing series Sx has five X direction bridge lines Bx. However, the ladder-like sensing series S2-1, S2-2, S2-3, S2-4 of FIG. 1 respectively only have two, four, four, and two third bridge lines 230. That is, the number of the third bridge line 230 of each of the ladder-like sensing series S2-1, S2-2, S2-3, S2-4 is less than that of the sensing series Sx or Sy of FIG. 2. While electrostatic discharge occurs, the jumper line may be broken and thus one of the sensing series may not be operated. Therefore, to reduce the number of the jumper lines is helpful for reducing abnormal probability in operation of sensing series. In the embodiment, the probability of breakage of the ladder-like sensing series S2-1, S2-2, S2-3, S2-4 is low because of less third bridge lines 230. Therefore, the problem arising from electrostatic discharge, which leads to abnormal operation of the sensing series, is solved. Further, since the process for forming the jumper lines is complicated, reducing the total amount of the jumper lines may improve a yield of the process.

In addition, in the present embodiment, as shown in FIG. 1, the second sensing pad 210 has a maximum width W1 larger than a width W2 of the second bridge line 220 and a width W3 of the third bridge line 230. In the embodiment, the second sensing pad 210 is substantially in a shape of rhombus, and the maximum width W1 refers to the maximum width along the third direction D3 (i.e., the horizontal direction).

The touch sensor array 20 further includes a plurality of first sensing signal transmission lines Y1, Y2, Y3, Y4, Y5 and a plurality of second sensing signal transmission lines X1, X2, X3, X4. The first sensing signal transmission lines Y1, Y2, Y3, Y4, Y5 are respectively electrically connected to the corresponding straight sensing series S1. The second sensing signal transmission lines X1, X2, X3, X4 are respectively electrically connected to the corresponding ladder-like sensing series S2-1, S2-2, S2-3, S2-4.

The substrate 10 has a side region R1 referred to as a single side of the peripheral position of the substrate 10. As shown in FIG. 1, the second sensing signal transmission lines X1, X2, X3 and the first sensing signal transmission lines Y1, Y2, Y3, Y4, Y5 are concentrated on the side region R1 of the substrate 10. The second sensing signal transmission line X1 is disposed between two adjacent first sensing signal transmission lines Y2, Y3, and the second sensing signal transmission line X2 is disposed between two adjacent first sensing signal transmission lines Y4, Y5.

As such, compared to sensing signal transmission lines x1-x5 of the comparative example of FIG. 2, each of the second sensing signal transmission lines X1, X2, X3 of the present embodiment has shorter length and thus has lower line impedance. Further, since the second signal transmission lines X1, X2, X3 are concentrated on the side region R1 of the substrate 10, a width of another side region R2 thereof may be reduced and thus to shorten a width of a border. Given the above, the embodiment is able to distribute more than half of the second signal transmission lines at the side region R1 of the substrate 10.

The first sensing signal transmission lines Y1, Y2, Y3, Y4, Y5 and the second signal transmission lines X1, X2, X3, X4 are respectively connected to ends T disposed on the side region R1 of the substrate 10. Also, the touch panel 1 further includes a drive circuit DC disposed on the side region R1 of the substrate 10, and the first sensing signal transmission lines Y1, Y2, Y3, Y4, Y5 and the second signal transmission lines X1, X2, X3, X4 are connected to the drive circuit DC. The drive circuit DC may be electrically connected to the first sensing signal transmission lines Y1, Y2, Y3, Y4, Y5 and the second signal transmission lines X1, X2, X3, X4 through each end T so as to drive each of the straight sensing series S1 and each of the ladder-like sensing series S2-1, S2-2, S2-3, S2-4.

The substrate 10 of the touch panel 1 may be a single-layered glass substrate, quartz substrate or plastic substrate. In other embodiments, the substrate 10 may be a color filter substrate or a thin film transistor array substrate. The embodiments that the substrate is the color filter substrate or the thin film transistor array substrate are described in detail below.

Figure 3:
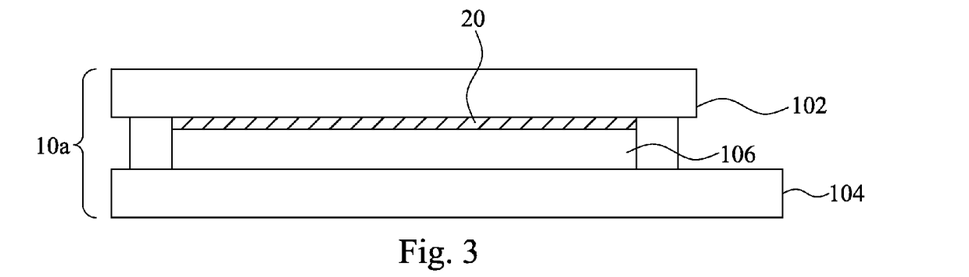
FIG. 3 is a cross-sectional view of a touch display panel according to one embodiment of the present disclosure.
Figure 4:
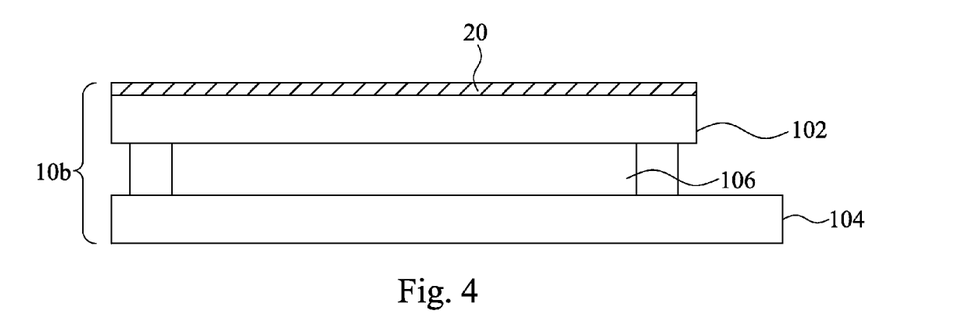
FIG. 4 is a cross-sectional view of a touch display panel according to another embodiment of the present disclosure.
Figure 5:
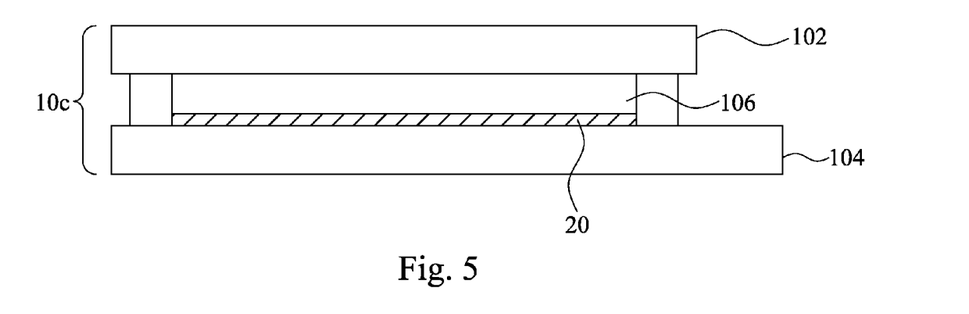
FIG. 5 is a cross-sectional view of a touch display panel according to a further embodiment of the present disclosure.

FIGS. 3-5 are cross-sectional views of touch display panels according to various embodiments of the present disclosure. As shown in FIGS. 3-5, each of the touch display panels 10a-10c includes a touch sensor array 20, a color filter substrate 102, a thin film transistor array substrate 104 and a display material layer 106 interposed therebetween.

As shown in FIG. 3, the touch sensor array 20 is disposed on an inner surface of the color filter substrate 102. As shown in FIG. 4, the touch sensor array 20 is disposed on an outer surface of the color filter substrate 102. As shown in FIG. 5, the touch sensor array 20 is disposed on an inner surface of the thin film transistor array substrate 104. However, the present disclosure is not limited thereto. If the thin film transistor array substrate 104 is replaced by a color filter on array (COA) substrate or an array on color filter (AOC) substrate, the color filter substrate 102 may be replaced by a substrate without color filters.

The display material layer 106 may be made of a non-self-luminous material, a self-luminous material or other suitable materials. The non-self-luminous material may be liquid crystal, an electrophoresis material or other suitable materials. The self-luminous material may be an organic light-emitting material, an inorganic light-emitting material or other suitable materials. In other words, the display panel may be a liquid crystal display (LCD) panel, an organic light emitting display panel or an electrophoretic display panel.

Figure 6A:
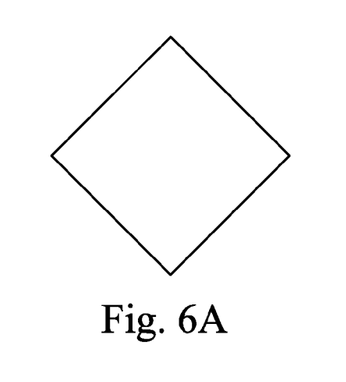
FIGS. 6A-6G are top views of first and/or second sensing pads according to various embodiments of the present disclosure.
Figure 6B:
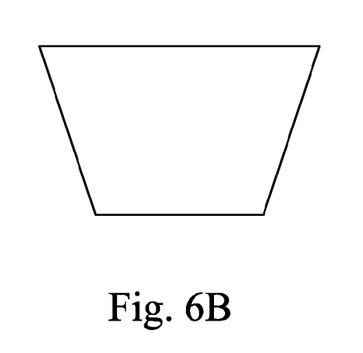
Figure 6C:
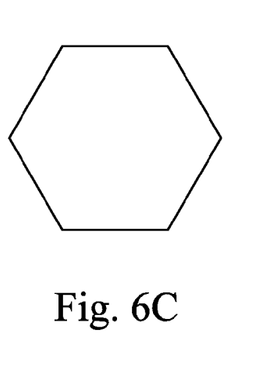
Figure 6D:
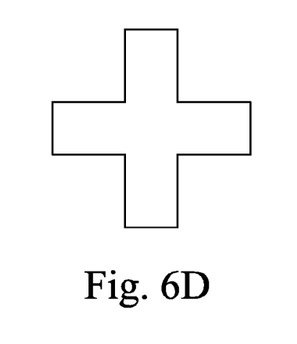
Figure 6E:
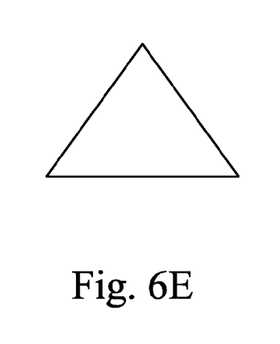
Figure 6F:
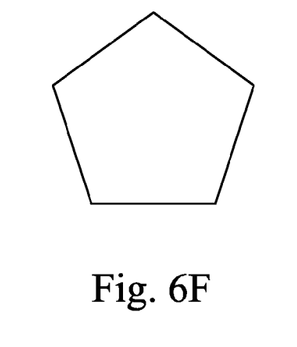
Figure 6G:
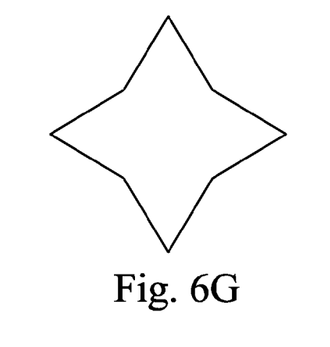

FIGS. 6A-6G are top views of first sensing pads 110 and/or second sensing pads 210 according to various embodiments of the present disclosure. The shape of the first sensing pad 110 and/or the second sensing pad 210 may be rhombus (as shown in FIG. 6A), trapezoid (as shown in FIG. 6B), hexagonal (as shown in FIG. 6C), cross shape (as shown in FIG. 6D), triangular (as shown in FIG. 6E), pentagon (as shown in FIG. 6F) or star (as shown in FIG. 6G).

Figure 7:
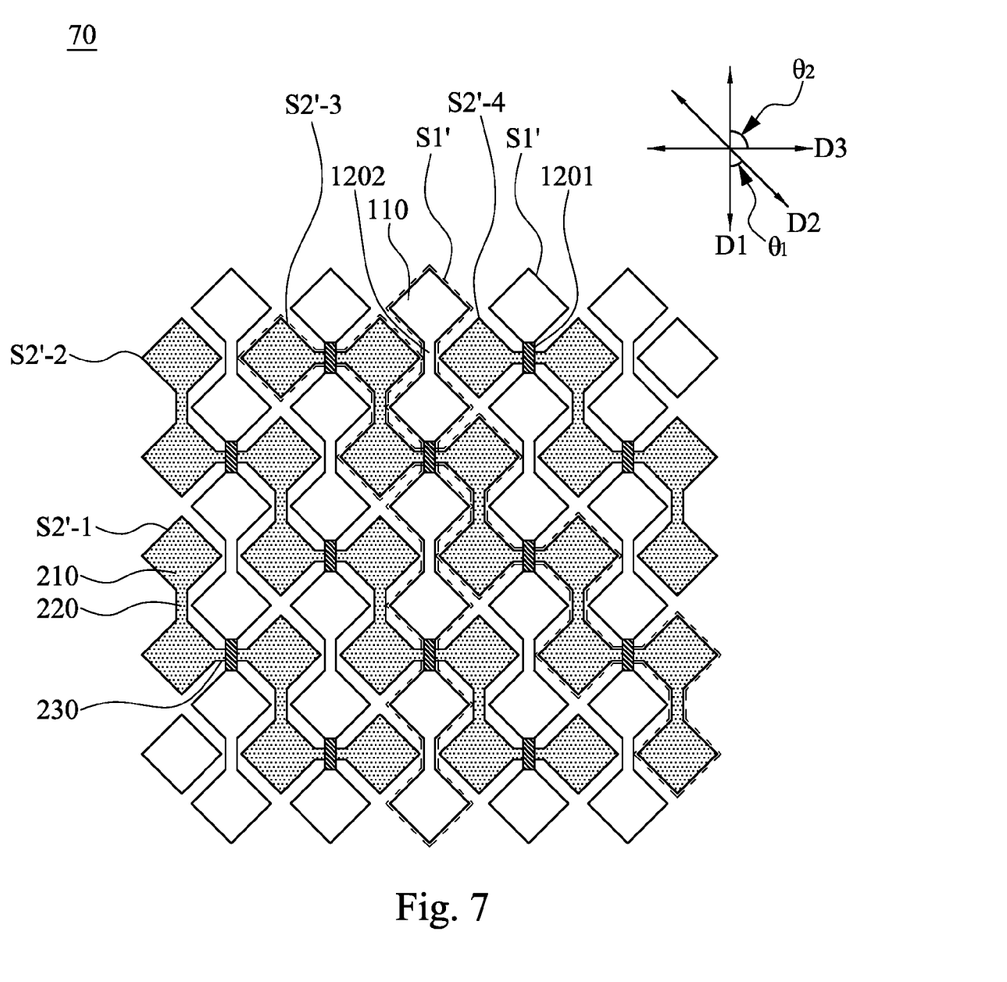
FIG. 7 is a top view of a touch sensor array according to a second embodiment of the present disclosure.

FIG. 7 is a top view of a touch sensor array 70 according to a second embodiment of the present disclosure. The touch sensor array 70 includes a plurality of straight sensing series S1' and a plurality of ladder-like sensing series S2'-1, S2'-2, S2'-3, S2'-4.

Each of the ladder-like sensing series S2'-1, S2'-2, S2'-3, S2'-4 includes second sensing pads 210, second bridge lines 220 and third bridge lines 230. The second sensing pads 210, the second bridge lines 220 and the third bridge lines 230 are disposed at a same layer of the touch sensor array 70. Specifically, the second sensing pads 210, the second bridge lines 220 and the third bridge lines 230 may be formed by a same photolithographic process and thus those may be made of a same material.

Each of the straight sensing series S1' includes first sensing pads 110 and first bridge lines 1201, 1202. For the single straight sensing series S1', the first sensing pad 110, the first bridge line 1201, another first sensing pad 110 adjacent to the first sensing pad 110, and the first bridge line 1202 are sequentially arranged and electrically connected. That is, in the straight sensing series S1', the first bridge line 1201 and the first bridge line 1202 are alternatively disposed. The first bridge line 1201 crosses the third bridge line 230 and is disposed thereon. That is, the first bridge line 1201 is used as a jumper line. In embodiments, the first bridge lines 1201 may be disposed beneath the third bridge lines 230.

In the embodiment, the first sensing pads 110, the first bridge lines 1202, the second sensing pads 210, the second bridge lines 220 and the third bridge lines 230 may be formed by a same layer, and the first bridge lines 1201 may be formed by another layer. That is, the first sensing pads 110, the first bridge lines 1202, the second sensing pads 210, the second bridge lines 220 and the third bridge lines 230 may be constituted by a single patterned conductive layer, and the first bridge lines 1201 may be constituted by another patterned conductive layer.

In the embodiment, the third bridge lines 230 and the first bridge lines 1201 may be made of different materials. For an example, the first bridge lines 1201 are made of metal, and the third bridge lines 230 are made of a transparent conductive material.

It is noted that the jumper line is a key factor for the line impedance. Since the ladder-like sensing series S2'-1, S2'-2, S2'-3, S2'-4 are constituted by the same patterned conductive layer without any jumper line, the line impedance of the ladder-like sensing series S2'-1, S2'-2, S2'-3, S2'-4 is more steady than that with the jumper line. Other specific features of the embodiment are similar to those corresponding elements of the first embodiment, and thus omitted herein.

Figure 8:
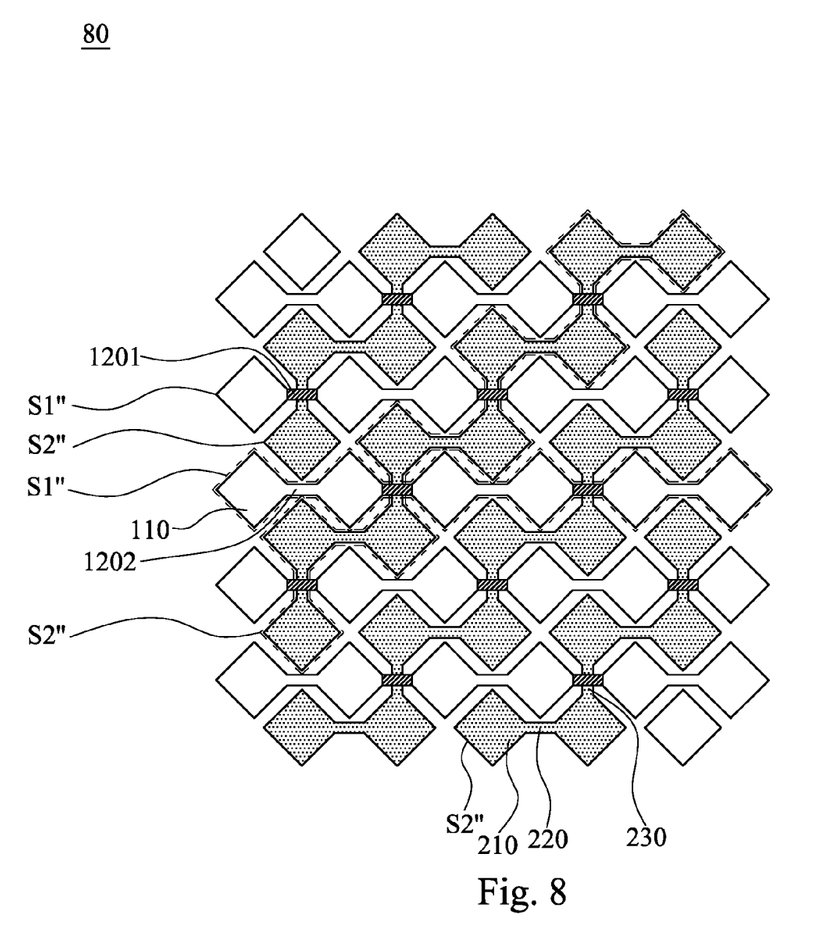
FIG. 8 is a top view of a touch sensor array according to a third embodiment of the present disclosure.

FIG. 8 is a top view of a touch sensor array 80 according to a third embodiment of the present disclosure. The touch sensor array 80 includes a plurality of straight sensing series S1" and a plurality of ladder-like sensing series S2". The touch sensor array 80 is configured in the same manner as the touch sensor array 70 at a 90° counter-clockwise rotation. Therefore, the specific features of the straight sensing series S1" and the ladder-like sensing series S2" may be the same as the straight sensing series S1' and the ladder-like sensing series S2' of the touch sensor array 70, and thus omitted herein.

As mentioned above, the embodiments of the present disclosure indeed provides a touch sensor array having less jumper lines and thus to effectively reduce abnormal probability in operation of sensing series arising from electrostatic discharge. In addition, the sensing signal transmission lines may be concentrated on a single side region of the substrate to reduce the line impedance of the sensing signal transmission lines and to shorten the width of the border.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A touch panel, comprising:
a substrate; and
a touch sensor array disposed on the substrate, the touch sensor array comprising: a plurality of straight sensing series separated to each other, the straight sensing series substantially extending along a first direction, each of the straight sensing series including a plurality of first sensing pads and a plurality of first bridge lines, each of the first bridge lines connected to two adjacent first sensing pads;
a plurality of ladder-like sensing series separated to each other, the ladder-like sensing series substantially extending along a second direction different from the first direction, each of the ladder-like sensing series including a plurality of second sensing pads, a plurality of second bridge lines and a plurality of third bridge lines, the second bridge lines and the third bridge lines alternatively disposed, any two adjacent second sensing pads connected through one of the second bridge lines or one of the third bridge lines: and
a plurality of first sensing signal transmission lines and a plurality of second sensing signal transmission lines, each of the first sensing signal transmission lines connected to one of the straight sensing series, each of the second sensing signal transmission lines is disposed between two adjacent first sensing signal transmission lines, wherein portions of the first bridge lines cross the third bridge lines respectively, and other portions of the first bridge lines do not cross the third bridge lines.

2. The touch panel of claim 1, wherein an included angle between the first direction and the second direction is about 45°, and the second bridge lines are substantially parallel to the first direction, and the third bridge lines are substantially parallel to a third direction different from the first direction and the second direction.

3. The touch panel of claim 2, wherein an included angle between the first direction and the third direction is about 90°.

4. The touch panel of claim 1, wherein each of the third bridge lines and each of the first bridge lines are disposed at various layers of the touch sensor array, and each of the third bridge lines and each of the first bridge lines are made of different materials, and each of the third bridge lines or each of the first bridge lines is made of metal.

5. The touch panel of claim 4, wherein the first bridge lines and the second bridge lines are disposed at a same layer.

6. The touch panel of claim 1, wherein the substrate includes a color filter substrate or a thin film transistor array substrate.

7. The touch panel of claim 1, wherein each of the second sensing pads has a width greater than a width of each of the second bridge lines and a width of each of the third bridge lines, and the first sensing pads and the second sensing pads are disposed at a same layer.

8. The touch panel of claim 1, wherein the touch sensor array further comprises:
a drive circuit disposed on a side region of the substrate, wherein the first sensing signal transmission lines and the second first sensing signal transmission lines are connected to the drive circuit.

9. The touch panel of claim 8, wherein ends of the first sensing signal transmission lines and ends of the second sensing signal transmission lines are disposed on the same side region of the substrate.

10. The touch panel of claim 1, wherein each of the first sensing pads or each of the second sensing pads has a shape of rhombus, trapezoid, hexagonal, cross shape, triangular, pentagon or star.

11. A touch panel, comprising: a substrate having a first to fourth side regions, wherein the first side region is opposite to the third side region, the fourth side region is substantially extending along a first direction, the first and the third side regions are substantially extending along a second direction, and the first direction and the second direction are different; and a touch sensor array disposed on the substrate, the touch sensor array including:

a plurality of first sensing series separated to each other, each of the first sensing series including a plurality of first sensing pads substantially surrounded by the first to fourth side regions, wherein each of the first sensing series has a first terminal located at the third side region and a second terminal located at the first side region; and a plurality of first sensing signal transmission lines and a plurality of second sensing signal transmission lines, each of the first sensing signal transmission lines connected to one of the straight sensing series, each of the second sensing signal transmission lines is disposed between two adjacent first sensing signal transmission lines, wherein portions of the first bridge lines cross the third bridge lines respectively, and other portions of the first bridge lines do not cross the third bridge lines.

12. The touch panel of claim 11, wherein the second sensing series are ladder-like.

13. The touch panel of claim 11, wherein an included angle between the first direction and the second direction is about 90°.

* * * * *